(12) United States Patent
Lee

(10) Patent No.: US 12,375,438 B2
(45) Date of Patent: *Jul. 29, 2025

(54) INTELLIGENT SORTING OF TIME SERIES DATA FOR IMPROVED CONTEXTUAL MESSAGING

(71) Applicant: Capital One Services, LLC, McLean, VA (US)

(72) Inventor: Jonathan Shek Wing Lee, Richmond Hill (CA)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,930

(22) Filed: Dec. 22, 2023

(65) Prior Publication Data

US 2024/0129267 A1 Apr. 18, 2024

Related U.S. Application Data

(63) Continuation of application No. 18/120,621, filed on Mar. 13, 2023, now Pat. No. 11,895,072, which is a (Continued)

(51) Int. Cl.
*H04L 51/216* (2022.01)
*G06F 18/23* (2023.01)
*G06F 18/24* (2023.01)
*G06N 20/20* (2019.01)
*G06V 30/19* (2022.01)
*H04L 51/04* (2022.01)

(52) U.S. Cl.
CPC ............ *H04L 51/216* (2022.05); *G06F 18/23* (2023.01); *G06F 18/24* (2023.01); *G06N 20/20* (2019.01); *G06V 30/19093* (2022.01); *G06V 30/19173* (2022.01); *H04L 51/04* (2013.01)

(58) Field of Classification Search
CPC ....... H04L 51/216; H04L 51/04; G06F 18/23; G06F 18/24; G06N 20/20; G06N 3/045; G06N 3/08; G06V 30/19093; G06V 30/19173
See application file for complete search history.

(56) References Cited

U.S. PATENT DOCUMENTS 7,917,582 B2 * 3/2011 Caspi .................. H04L 12/1827 370/545
9,654,426 B2 5/2017 Underwood, IV et al.
(Continued)

*Primary Examiner* — Abdullahi E Salad
(74) *Attorney, Agent, or Firm* — Banner & Witcoff, Ltd.

(57) ABSTRACT

Systems for intelligent sorting of time series data for improved contextual messaging are included herein. An intelligent sorting server may receive time series data comprising a plurality of chat messages. The intelligent sorting server may determine a first order of the plurality of chat messages based on a chronologic order. The intelligent sorting server may use one or more machine learning classifiers to identify candidates for reordering the chat messages. The intelligent sorting server may generate a second order of the chat messages based on the identified candidates for reordering. Accordingly, the intelligent sorting server may present, to a client device, a transcript of the chat messages associated with the second order and an indication that at least one chat message has been repositioned.

20 Claims, 6 Drawing Sheets

Related U.S. Application Data continuation of application No. 17/399,561, filed on Aug. 11, 2021, now Pat. No. 11,611,524.

(56) References Cited

U.S. PATENT DOCUMENTS

| | | | | |
|---|---|---|---|---|
| 9,804,752 | B1* | 10/2017 | Mall | H04L 51/04 |
| 10,475,100 | B1 | 11/2019 | Herz et al. | |
| 10,701,014 | B2 | 6/2020 | Perazzo et al. | |
| 10,783,877 | B2 | 9/2020 | Solanki et al. | |
| 10,819,532 | B1 | 10/2020 | van Rensburg et al. | |
| 10,847,161 | B2 | 11/2020 | Ramasamy et al. | |
| 10,860,629 | B1 | 12/2020 | Gangadharaiah et al. | |
| 10,937,034 | B2 | 3/2021 | Maag et al. | |
| 10,956,684 | B2 | 3/2021 | Penrose et al. | |
| 10,990,980 | B1 | 4/2021 | Reses et al. | |
| 10,992,765 | B2 | 4/2021 | Kursun | |
| 11,302,310 | B1* | 4/2022 | Gandhe | G10L 15/065 |
| 2007/0214424 | A1* | 9/2007 | Gilead | G06Q 10/107 |
| | | | | 709/204 |
| 2008/0263157 | A1* | 10/2008 | Bhogal | G06Q 10/107 |
| | | | | 709/206 |
| 2013/0121481 | A1* | 5/2013 | Mikan | H04L 51/216 |
| | | | | 379/88.14 |
| 2014/0096033 | A1* | 4/2014 | Blair | H04L 51/56 |
| | | | | 715/752 |
| 2017/0134329 | A1* | 5/2017 | Edgar | H04L 51/226 |
| 2018/0301046 | A1* | 10/2018 | Nedivi | H04L 51/046 |
| 2021/0091919 | A1* | 3/2021 | Geng | H04L 7/0008 |
| 2021/0142206 | A1* | 5/2021 | Ghanea-Hercock | |
| | | | | G06F 21/602 |

* cited by examiner

INTELLIGENT SORTING OF TIME SERIES DATA FOR IMPROVED CONTEXTUAL MESSAGING

CROSS-REFERENCE TO RELATED APPLICATIONS

The instant application claims priority to and is a continuation of co-pending U.S. patent application Ser. No. 18/120,621, titled "Intelligent Sorting of Time Series Data for Improved Contextual Messaging," and filed Mar. 13, 2023, which claims priority to and is a continuation of U.S. patent application Ser. No. 17/399,561, titled "Intelligent Sorting of Time Series Data for Improved Contextual Messaging," and filed Aug. 11, 2021, and issued as U.S. Pat. No. 11,611,524 on Mar. 21, 2023, the disclosure of which is hereby incorporated by reference in its entirety.

FIELD OF USE

Aspects of the disclosure relate generally to data processing and more specifically to the processing and management of big data.

BACKGROUND

In an electronic messaging system, a server may receive multiple messages from a plurality of client devices. As the messages arrive at the server, some messages may be delayed and certain messages may not arrive sequentially from a particular client. Conventional systems may fail to recognize these out-of-order messages and still display the messages in chronological order. As a result, conventional systems may not follow the natural flow of a conversation and cause confusion for users trying to understand their chat messages.

Aspects described herein may address these and other problems, and generally improve the quality, efficiency, and speed of processing data to offer insights into conversational data so that users may make informed decisions.

SUMMARY

The following presents a simplified summary of various aspects described herein. This summary is not an extensive overview, and is not intended to identify key or critical elements or to delineate the scope of the claims. The following summary merely presents some concepts in a simplified form as a prelude to the more detailed description provided below. Corresponding apparatus, systems, and computer-readable media are also within the scope of the disclosure.

Systems as described herein may include features for intelligent sorting of time series data for improved contextual messaging. A server system (e.g. an intelligent sorting server) may receive time series data including a plurality of chat messages from a plurality of client devices. Each chat message may have a timestamp that corresponds to the time that it was transmitted to the server system. A first order of the plurality of chat messages may be determined based on a chronologic order of the corresponding timestamps. The server system may use one or more machine learning classifiers to identify candidates for reordering the chat messages based on, for example, a similarity score indicating contextual similarities between a pair of chat messages. The server system may generate a second order of the chat messages based on the identified candidates for reordering. The server may provide, to a client device, a transcript of the chat messages associated with the second order and an indication that at least one chat message has been repositioned.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
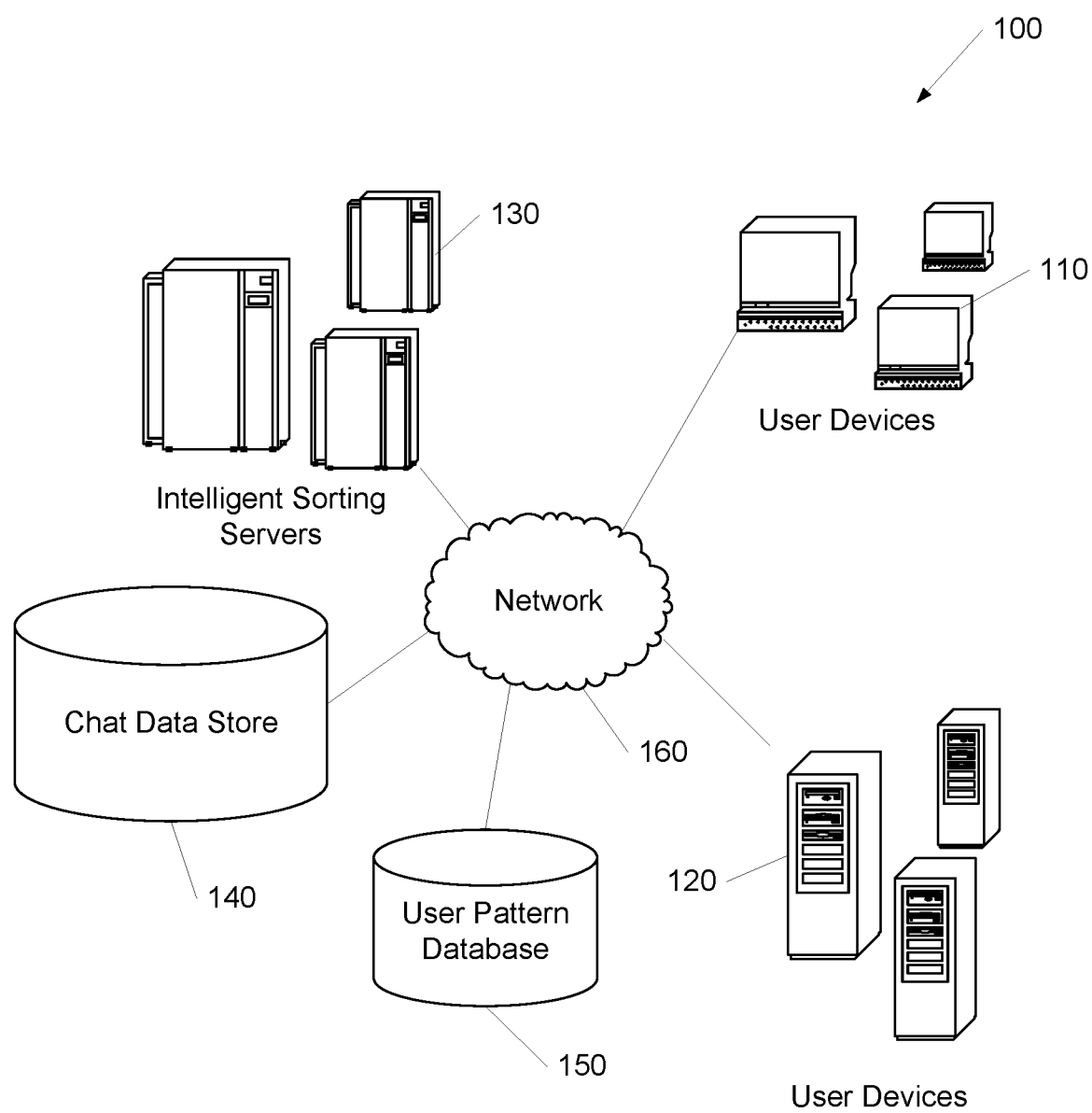
FIG. 1 depicts an example of a system for intelligent sorting of time series data in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for intelligent sorting of time series data for improved contextual messaging. In an electronic messaging processing network, a server system may use a first machine learning classifier to generate similarity scores for a plurality of chat messages. A similarity score may indicate a contextual similarity between a chat message and a previous chat message. The server system may use a second machine learning classifier to identify the candidates for reordering based on probability scores. A probability score may indicate a likelihood that a chat message is to be clustered with any previous chat message. The server may use the similarity scores generated by the first machine learning classifier as inputs for the second machine learning classifier. In addition to the similarity scores, the second machine learning classifier may use the corresponding timestamps of the messages and typing patterns of users as inputs. In an example, the first machine learning classifier may be an unsupervised machine learning classifier and the second machine learning classifier may be a supervised machine learning classifier.

In many aspects, the server system may assign a first weight associated with a timestamp difference between a chat message and a previous chat message. The server system may assign a second weight associated with a similarity score between the chat message and the previous chat message. The server system may assign the first weight to be greater than the second weight. The server system may use the machine learning classifier to identify the candidates for reordering based on the first weight and the second weight. The server system may assign a third weight associated with a typing pattern for at least one sender of the chat message or the previous chat message. The third weight may be smaller than the first weight and the second weight. The server system may use the second machine learning classifier to identify the candidates for reordering based on the third weight.

In many aspects, the server system may determine a domain associated with the machine learning classifier. The server system may train the first machine learning classifier based on domain specific training data.

Intelligent Sorting System

FIG. 1 shows an example of a system 100 where time series data such as chat messages may be sorted intelligently for improved contextual messaging. The system 100 may include one or more user devices 110-120, at least one intelligent sorting server 130, at least one chat data store 140, and/or at least one user pattern database 150 in communication via a network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

User devices 110-120 may be any device that belongs to a customer of a business organization, such as a financial institution. The customers may conduct transactions with the financial institution using user devices 110-120. User devices 110-120 may also be any device that belongs to a user, such as a customer service agent, of the business organization. The customers or users may send chat messages to the financial institution using user devices 110-120 to engage in a variety of activities. For example, a customer may send chat messages to a customer service agent inquiring about charges on a credit card. The customer may make an online payment using user devices 110-120 and chat with the customer service agent for assistance. A customer may send chat messages to a customer service agent reporting fraudulent activities related to an account. User devices 110-120 may receive a transaction summary related to previously conducted purchases through a chat UI with the customer service agent. In some examples, user devices 110 may also engage in chat sessions with user devices 120. In other examples, user devices 110 may be used by customers of a business organization and user devices 120 may be used by customer service agents in the business organization.

The chat sessions may include various chat messages and each chat message may correspond to a timestamp (e.g. the timestamp when the message was created in a local computer time of user devices 110-120). The chat messages may arrive at a target user device or a financial institution, such as a server (e.g. intelligent sorting server 130) at various times. However, a latency between a user device and a server may cause messages to be delayed and the natural flow of the conversation between a user and a customer service agent may be broken up, that is out of order. As messages arrive at the server, the messages may not arrive sequentially from a single user device. For example, some messages may be delayed more than other messages, or certain messages may be swapped in their orders. Typing speed of the customers or the agents may also affect the order of the messages being displayed on the chat UI of user devices 110-120. As a result, some messages may be displayed on the chat UI in a chronological order, but may not make logic sense. User devices 110-120 may include client agents or applications that may monitor inputs from the customers or the customer service agents, such as their typing speeds, and their patterns in previous chat messages, such as key words they used in query messages. User devices 110-120 may send the typing speeds and user patterns to intelligent sorting server 130 for processing.

Intelligent sorting server 130 may receive from a plurality of user devices 110-120, time series data including a plurality of chat messages. Each chat message has a timestamp corresponding to the time the message was transmitted to intelligent sorting server 130. Intelligent sorting server 130 may determine that the chat message is associated with a chat session between a user and a customer service agent. Intelligent sorting server 130 may determine that the chat message is associated with a chat session between two users. Intelligent sorting server 130 may determine that a plurality of chat messages is associated with a particular user. Intelligent sorting server 130 may receive typing speeds and user patterns from user devices 110-120 and store the relevant information in user pattern database 150.

Intelligent sorting server 130 may attempt to preprocess the raw time series data comprising the chat messages. The chat messages may be in a non-standard format, such as a non-structured form, or in the form of a line of data, or in a text format. The chat messages may be converted into a standard format, such as a JSON or XML format. Intelligent sorting server 130 may determine a first order of these chat messages based on a chronologic order of the corresponding timestamps. For example, a timestamp of the chat message may reflect a local computer time of a user device when the message was transmitted to the intelligent sorting server 130.

Intelligent sorting server 130 may use one or more machine learning classifiers to identify candidates for reordering the chat messages. Intelligent sorting server 130 may use a first machine learning classifier to generate similarity scores for the chat messages that are associated with a chat session between a user and a customer service agent, or a chat session between two users. Based on the chronologic order, intelligent sorting server 130 may determine a chat message and a previous chat message relative to the chat message. Intelligent sorting server 130 may determine a similarity score indicating a contextual similarity between the chat message and the previous chat message. For example, intelligent sorting server 130 may use training data including tagged time series data indicating a plurality of contextually similar chat messages to train the first machine learning classifier. Intelligent sorting server 130 may provide, as input to the trained first machine learning model, the chat message and the previous chat message. Intelligent sorting server 130 may receive, as output from the trained first machine learning model, a similarity score indicating a degree of similarity between the chat message and the previous chat message.

Intelligent sorting server 130 may use a second machine learning classifier to identify chat message candidates for reordering. For example, intelligent sorting server 130 may use tagged chat messages indicating identified candidate messages for reordering to train the second machine learning classifier. Intelligent sorting server 130 may provide, for example, the chat messages, their timestamps or time periods between a pair of chat messages, their similarity scores, user typing patterns, query indications (e.g. a question mark or language indicating a query in the chat messages) to the trained second machine learning classifier. Intelligent sorting server 130 may receive, as output from the trained second machine learning model, a probability score indicating a likelihood that a particular chat message may be a candidate for reordering.

Intelligent sorting server 130 may reorder the chat messages based on the identified one or more candidates for reordering, and generate a second order of the chat messages. The second order may be based on a chronologic order, or a contextual order, and or both. Intelligent sorting server 130 may provide, to a client device, a transcript of the chat messages associated with the second order and an indication that at least one chat message has been repositioned.

Chat data store 140 may store time series data including chat messages from various user devices 110-120. The chat messages may be pre-processed in a standard format. The chat messages may be pre-processed to identify query indications such as a question mark or language indicating a query. The pre-processed chat messages may be stored in chat data store 140. Chat data store 140 may store the timestamps, time periods associated with a pair of chat messages, and/or the query indications with the chat messages. Chat data store 140 may store training data such as tagged time series data including a plurality of contextually similar chat messages and their corresponding similarity scores. Chat data store 140 may store training data including tagged chat messages indicating pre-identified candidate messages for reordering. After intelligent sorting server 130 determines the similarities scores, the probability scores, and the candidate chat messages for reordering, it may store them in chat data score 140.

User pattern database 150 may store user information related to users or customer service agents, such as indications of their typing speeds, and other user patterns, for example, the key words the user may use for indicating a query in the chat messages. The user pattern information may be gleaned by user devices 110-120 and processed by intelligent sorting server 130. Intelligent sorting server 130 may store the user pattern information in user pattern database 150. As new chat messages arrive in intelligent sorting server 130, the user pattern information may be enhanced and continue to be stored in user pattern database 150.

User devices 110-120, intelligent sorting server 130, chat data store 140, and/or user pattern database 150 may be associated with a particular authentication session. Intelligent sorting server 130 may receive, process, and/or store a variety of chat messages, and user pattern information, and/or send transcripts with reordered messages to user devices 110-120 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. Network 160 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Computing Devices

Figure 2:
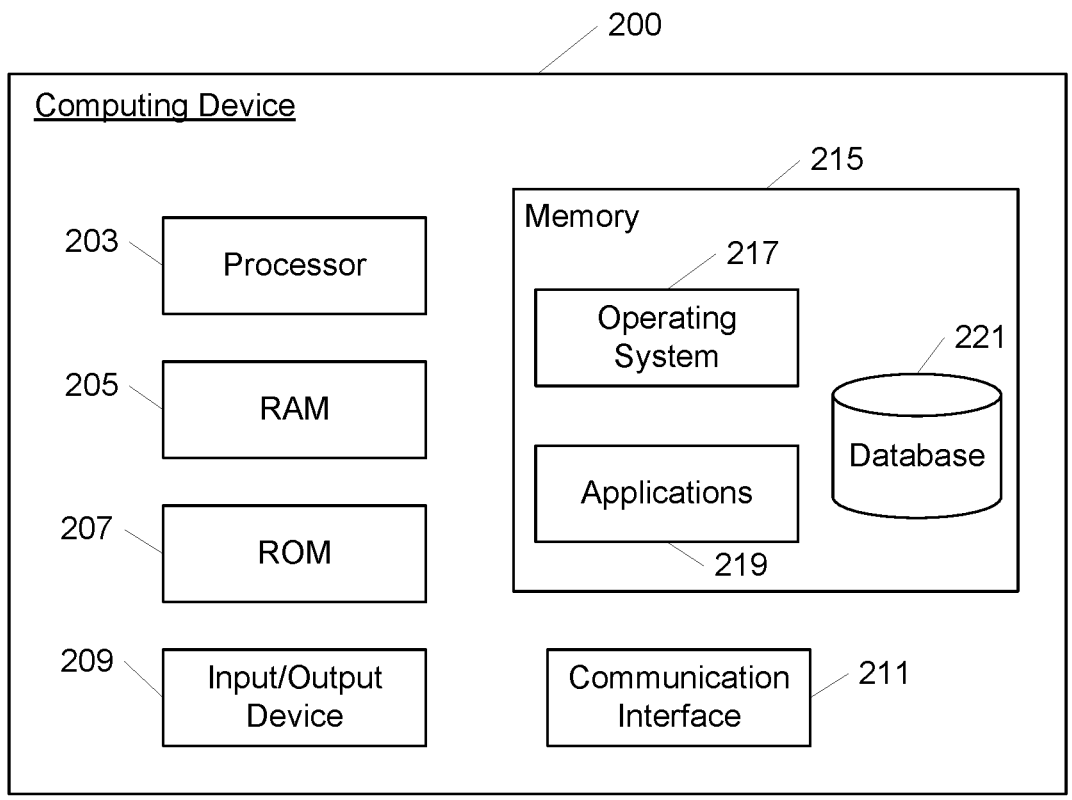
FIG. 2 depicts an example of a computing device that may be used in implementing one or more aspects of the disclosure in accordance with one or more illustrative aspects discussed herein.

Turning now to FIG. 2, a computing device 200 that may be used with one or more of the systems 100 is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile media, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Deep Neural Network Architecture

Figure 3:
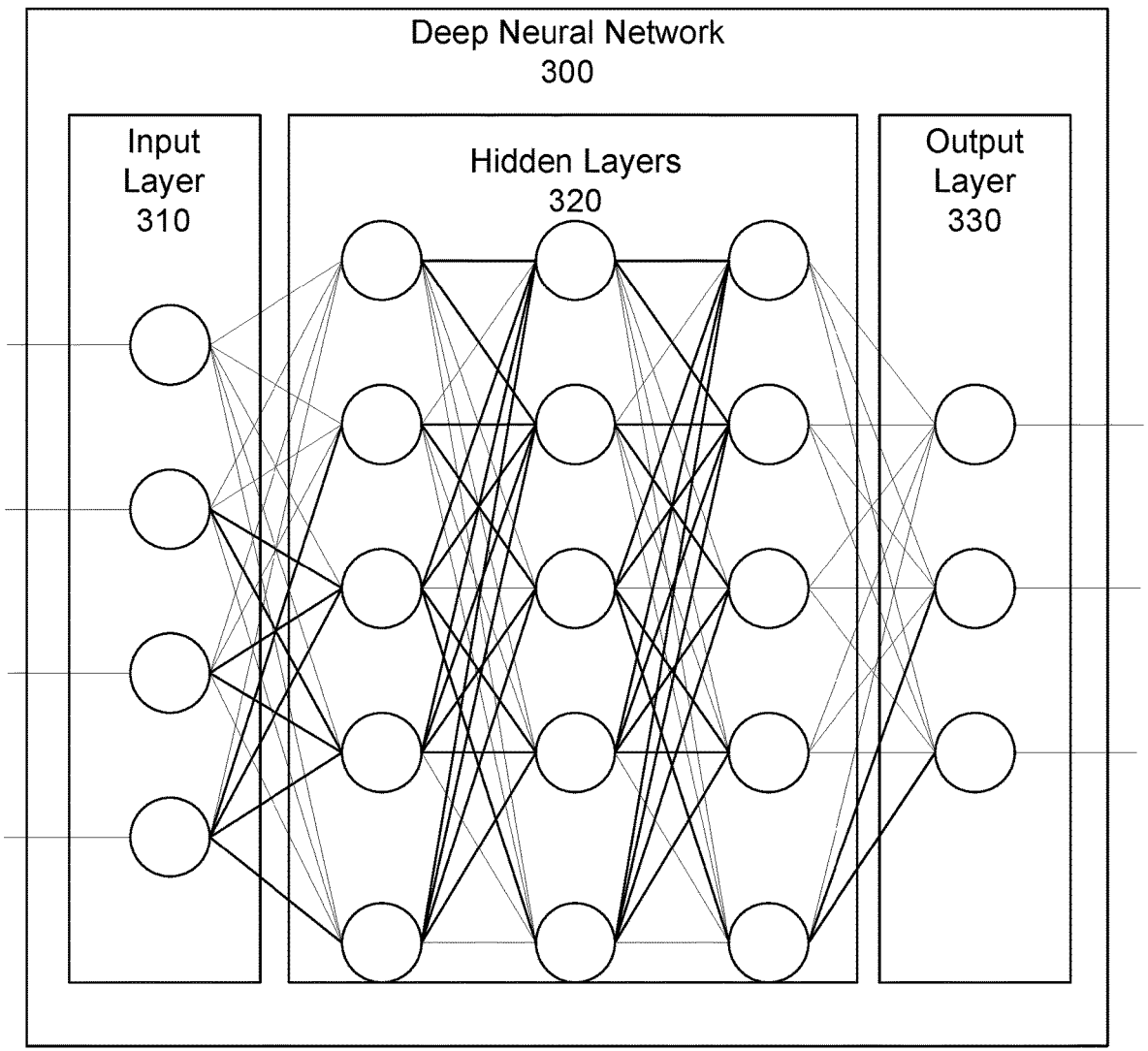
FIG. 3 depicts an example deep neural network architecture for a model according to one or more aspects of the disclosure.

FIG. 3 illustrates an example deep neural network architecture 300. Such a deep neural network architecture may be implemented by a computing device 200 shown in FIG. 2. That said, the architecture depicted in FIG. 3 need not be performed on a single computing device, and might be performed by, e.g., a plurality of computers. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 310, one or more hidden layers 320, and an output layer 330. A deep neural network, as used herein, may be an artificial network that has more than one hidden layer. Illustrated network architecture 300 is depicted with three hidden layers, and thus may be considered a deep neural network. The number of hidden layers employed in deep neural network 300 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Intelligent Sorting Chat Messages

The intelligent sorting system may process raw time series data, examine the context of the chat messages and cluster similar messages together if their timestamps fall within a specific time range (i.e., in which they are relatively close in time to each other). The intelligent sorting system may implement one or more machine learning classifiers to consider factors such as timestamps, contextual similarities, and user typing speeds to identify candidates for reordering the messages. The intelligent sorting system may implement a layer of a feedback loop when the reordered chat messages are displayed to users for their feedback as to whether the reordered messages follows a logic of conversation. As such, the time series data may be transformed into visual representations of the chat messages with indications of repositioned messages, which may resonate with the users to facilitate communication and decision making.

Figure 4:
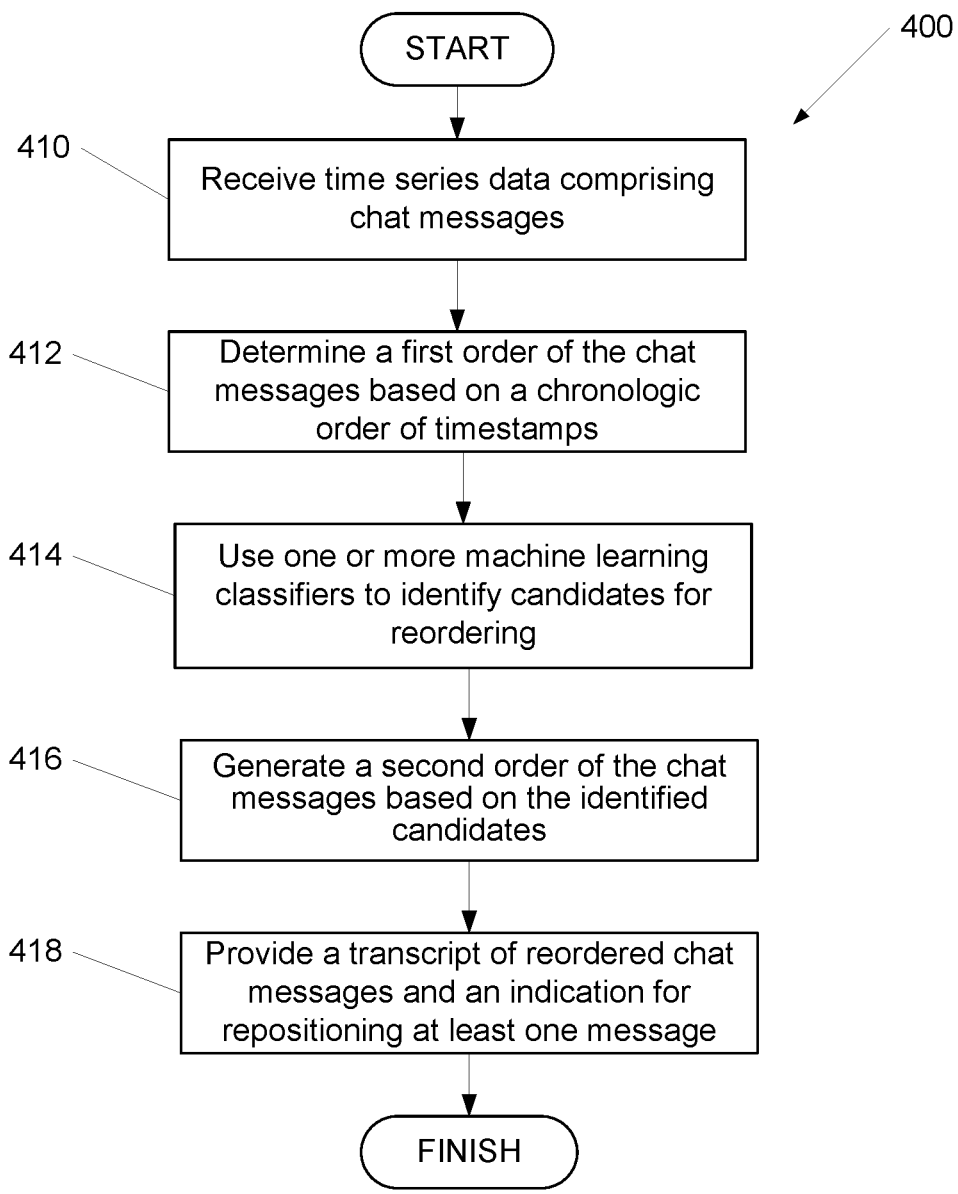
FIG. 4 shows a flow chart of a process for intelligent sorting of time series data for improved contextual messaging according to one or more aspects of the disclosure.

FIG. 4 shows a flow chart of a process for intelligent sorting time series data for improved messaging according to one or more aspects of the disclosure. Some or all the steps of process 400 may be performed using one or more computing devices or deep neural networks as described herein. In a variety of embodiments, some or all the steps described below may be combined and/or divided into sub-steps as appropriate.

At step 410, an intelligent sorting server may receive time series data comprising chat messages from user devices. For example, the chat messages may be between a user and a customer service agent. Each chat message may have a timestamp indicating a local computer time of the client device when the chat message was transmitted to the intelligent sorting server. For example, a customer service agent may send a message: "Hi there, my name is Joe. How can I help you today?" at timestamp T1. The customer may respond with the message: "Hi Joe. I'd like to report fraud on my card" at timestamp T2. T1 may correspond to a local computer time on a user device used by the agent and T2 may correspond to a local computer time on a user device used by the customer. T1 and T2 may correspond to the timestamps when the chat messages were transmitted to the intelligent sorting server. T1 and T2 may also correspond to the timestamps that the user or the agent started to type the messages on their respective user devices. The customer service agent may send a message at timestamp T3: "Can you provide your CVC2 number?" The customer may send a message at timestamp T4: "123." The agent may send a message at timestamp T5: "This is the 3 digits on the back of your card." The agent may send a message at timestamp T6: "Thank you."

In a variety of embodiments, the user devices may have a chat agent or a chat application installed to monitor and capture input behavior of the users in real time. For example, the user devices may capture when a user starts typing a message and send the corresponding timestamp with the message to the intelligent sorting server. The user devices may also capture user patterns such as the typing speed of a user and send the user pattern information to the intelligent sorting server.

In a variety of embodiments, there may be latency between the client devices and the intelligent sorting server. The display of some messages on the user devices may be delayed and the flow of the conversation may be broken up, that is out of order. As messages arrive at the intelligent sorting server, the messages may not arrive sequentially from a single user device. There are cases that certain messages may be delayed more than other messages, or the messages may be swapped in their orders. Although a user may start typing a message in response to an agent's inquiry, the user may type at a slow speed, which may contribute to the delay of the user's message and such message may arrive at the intelligent sorting server out of order. In some examples, the user and the agent may start typing simultaneously, the user's message "123" may arrive at T4 faster than the agent's message "This is the 3 digits on the back of your card" at T5, because the user's message is shorter and may be transmitted quicker. Such out of order messages may break the logical flow of the messages and cause confusion in the chat log in real time or at a later time when the chat log may be reviewed.

In a variety of embodiments, the intelligent sorting server may pre-process the chat messages. For example, the intelligent sorting server may receive the time series data in non-standard format, such as a non-structured format or a line of data. The intelligent server may pre-process the chat messages and convert them into a standard format such as JSON or XML format. The chat messages may be pre-processed to identify query indications such as a question mark. The intelligent sorting server may use a natural language process (NLP) to identify keywords or language indicating a query or related to a specific domain. A domain may include, for example, a generic chat domain or a personal finance related domain. For example, based on the key words "fraud," "card," and "CVC2," the intelligent sorting server may determine the chat messages at T1-T6 relate to a personal finance domain.

At step 412, the intelligent sorting server may determine a first order of the chat messages based on a chronologic order of the corresponding timestamps. For example, the first order may be determined based on the timestamps T1-T6. As discussed above, the chronologic order of the chat messages may not reflect the logic flow of the conversation between the customer and the agent, and certain messages may be out of order.

At step 414, the intelligent sorting server may use one or more machine learning classifiers to identify candidates for reordering the chat messages. In a variety of embodiments, the intelligent sorting server may examine the timestamps of the messages originated from a single user device. If the user started typing a message before a future message came through, the message may more likely be associated with a previous message. As such, the intelligent sorting server may examine input behavior of the user in real time, which may be captured in the chat application or chat agent on the user devices.

In a variety of embodiments, the intelligent sorting server may examine the context of the chat messages, using contextual clues within the chat messages. For example, if the message contains a question mark, the user is likely waiting for a response after sending the chat message. As a result, the next message originated from the same user may be less likely to be associated with the previous message sent by the user. In another example, if the message contains a question mark, the user may further send a message to offer an explanation related to the previous question. As a result, the next message originated from the same user may more likely be associated with the previous message sent by the user.

The intelligent sorting server may use a first machine learning classifier to cluster the chat messages based on similarity scores of the messages. A similarity score may indicate a contextual similarity between a chat message and a previous chat message. The intelligent sorting server may determine a domain associated with the machine learning classifier. The intelligent sorting server may train the first machine learning classifier based on domain specific training data. For example, the intelligent sorting server may use training data including tagged personal finance time series data indicating a plurality of contextually similar chat messages to train the first machine learning classifier. Based on the keywords in the chat messages, the intelligent sorting server may determine that the messages relate to a personal finance domain. The first machine learning classifier may be trained to recognize keywords related to personal finance domain. For example, if the chat message at T3 is "a Can you provide your CVC2 number," the first machine learning classifier may recognize that the CVC2 number contains three digits. The message at T5 is "this is the 3 digits on the back of your card." The first machine learning classifier may determine it is highly likely that the T3 and T5 messages are related and may increase the similarity score so that they may be allocated in the same cluster.

Intelligent sorting server may provide, as input to the trained first machine learning model, the chat message and the previous chat message. Intelligent sorting server may receive, as output from the trained first machine learning classifier, a similarity score indicating a degree of similarity between the chat message and the previous chat message. For example, the first machine learning classifier may determine a first similarity score S1 between the chat message at T3 "Can you provide your CVC2 number" and the chat message at T4 "123." The first machine learning classifier may determine a second similarity score S2 between the chat message at T3 "Can you provide your CVC2 number" and the chat message at T5 "this is the 3 digits on the back of your card." The intelligent sorting server may determine that S2 is greater than S1. If the difference between S2 and S1 has reached a threshold value (e.g. 50%), this may be an indication that the messages at T3 and T5 belong to the same cluster. In a variety of embodiments, the first machine learning classifier may be an unsupervised machine learning classifier.

The intelligent sorting server may use a second machine learning classifier to identify the candidates for reordering based on probability scores. A probability score may indicate a likelihood that the chat message is to be clustered together with a previous chat message. The server may use the similarity scores generated by the first machine learning classifier as an input for the second machine learning classifier. The second machine learning classifier may also use other inputs such as the corresponding timestamps of the messages and typing patterns. For example, intelligent sorting server 130 may use tagged chat messages indicating identified candidate messages for reordering to train the second machine learning classifier. Intelligent sorting server 130 may provide, for example, the chat messages, their timestamps or time periods between a pair of messages, their similarity scores, user typing patterns, and/or query indications (e.g. a question mark or language indicating a query in the chat messages) to the trained second machine learning classifier. Intelligent sorting server 130 may receive, as output from the trained second machine learning model, a probability score indicating a likelihood that a particular chat message may be a candidate for reordering. For example, the second machine learning model may determine that the messages at T3 and T5 have a high probability (e.g. 90%) to be clustered together and the message at T5 may be a candidate for reordering.

In a variety of embodiments, the intelligent sorting server may assign a first weight W1 associated with a timestamp difference between a chat message (e.g. message at T5) and a previous chat message (e.g. message at T3). The timestamp difference may be, for example, a difference between T5 and T3. The intelligent sorting server may assign a second weight W2 associated with a similarity score between the chat message and the previous chat message. The first weight W1 may be greater than the second weight W2. The intelligent sorting server may use the machine learning classifier to identify the candidates for reordering based on the first weight W1 and the second weight W2.

The intelligent sorting server may assign a third weight W3 associated with a typing pattern for at least one sender of the chat message or the previous chat message. The typing pattern may be a difference in the typing speeds between a customer and a customer service agent. The third weight W3 may be smaller than the first weight W1 and the second weight W2. The intelligent sorting server may use the second machine learning classifier to identify the candidates for reordering based on W1-W3. As such, the intelligent sorting server may adjust the weights on various parameters. The intelligent sorting server may assign a greater weight to the timestamps. For example, if two messages have a medium similarity score (e.g. 60%), and the timestamps indicates they are very far apart (e.g. more than 5 seconds), these two messages may not be clustered together. If two messages have a high similarity score (e.g. 85%), and the timestamps indicate they are not far apart (e.g. 1 second), these two messages may be clustered together. In another example, if two messages have a very high similarity score (e.g. 99%), and the timestamps indicates they are very far apart (e.g. more than 5 seconds), these two messages may still be clustered together. In another example, the timestamps may be a determinative factor. If two messages are very far apart (e.g. more than 5 seconds), these two messages may not be clustered together, even though they have a very high similarity score (e.g. 99%).

Figure 5A:
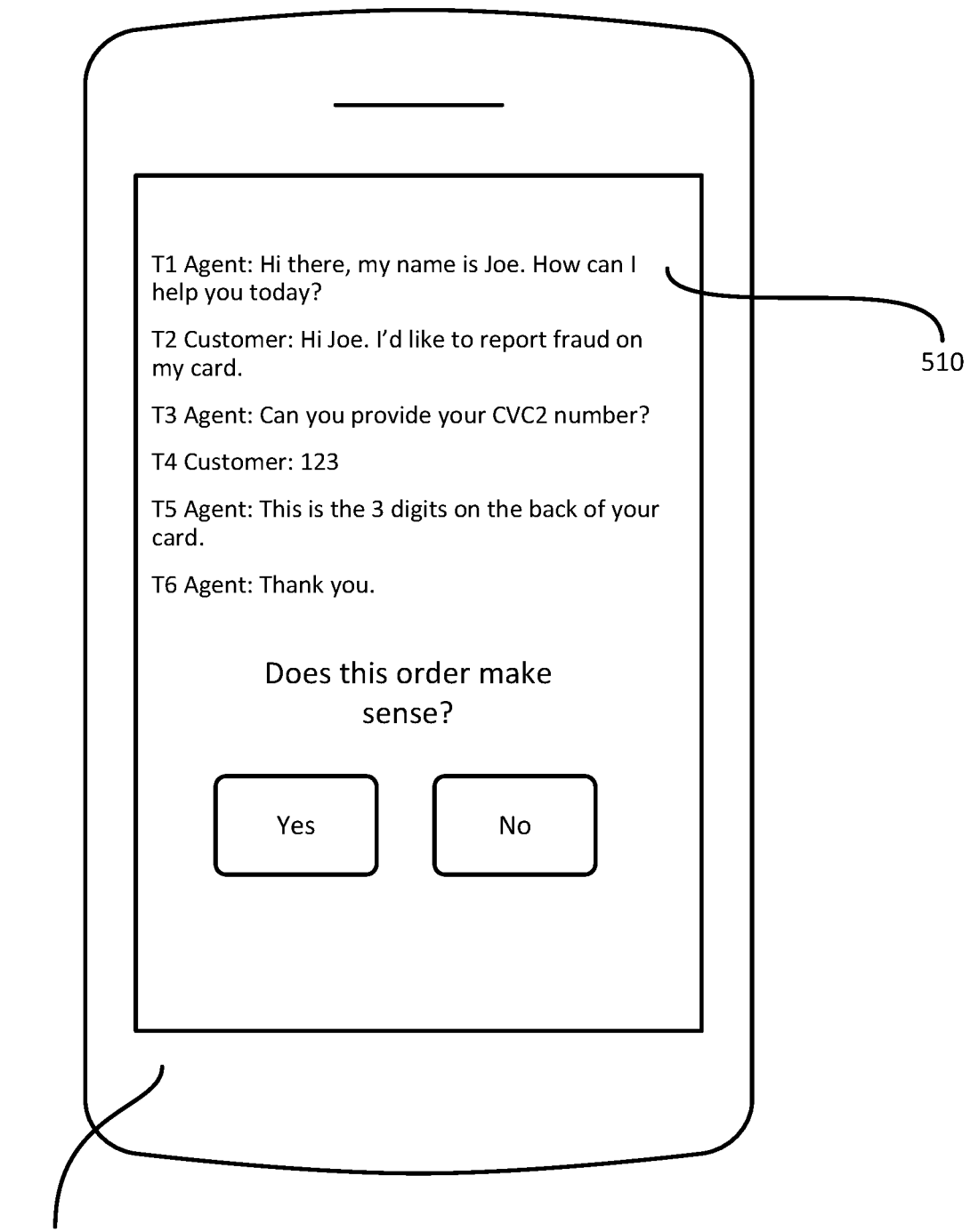
FIGS. 5A-5B show example user interfaces displaying transcripts of the chat messages according to one or more aspects of the disclosure.

The second machine learning model may be a supervised model. For example, during the training process, the intelligent sorting model may present the messages in a chronological order to the user for feedback. The user may confirm whether such order makes sense based on the logic flow of the conversation. FIG. 5A shows an example user interface displaying a transcript of chat messages according to one or more aspects of the disclosure. The transcript may be based on a chronologic order of the chat messages with timestamps T1-T6 in screen 510 of a user device 500. The display may provide options for user to confirm whether this chronologic order of messages makes sense to the user. The user may choose "Yes" to confirm or "No" to reject such order. Likewise, after the messages have been re-ordered, the intelligent sorting model may present the reordered messages to the user for feedback. The user may confirm whether the newly re-ordered messages make better sense than the messages in the chronologic order.

In a variety of embodiments, the intelligent sorting server may implement a two-stage model. The intelligent sorting machine may first examine the similarity of two messages from the content perspective. The intelligent sorting server may use the output (e.g. similarity scores) from the first stage as an input to the second stage. The second stage may consider other characteristics of the messages (e.g. timestamps, time differences, user patterns, query indications) on identifying candidates for reordering. Based on the identified candidates, the intelligent sorting server may determine whether any messages may be swapped or whether the messages may be clustered differently from their chronologic order.

At step 416, the intelligent sorting server may determine a second order of the chat messages based on the identified candidates for reordering. The second order may be different from the chronologic order, if at least one candidate has been identified for reordering.

Figure 5B:
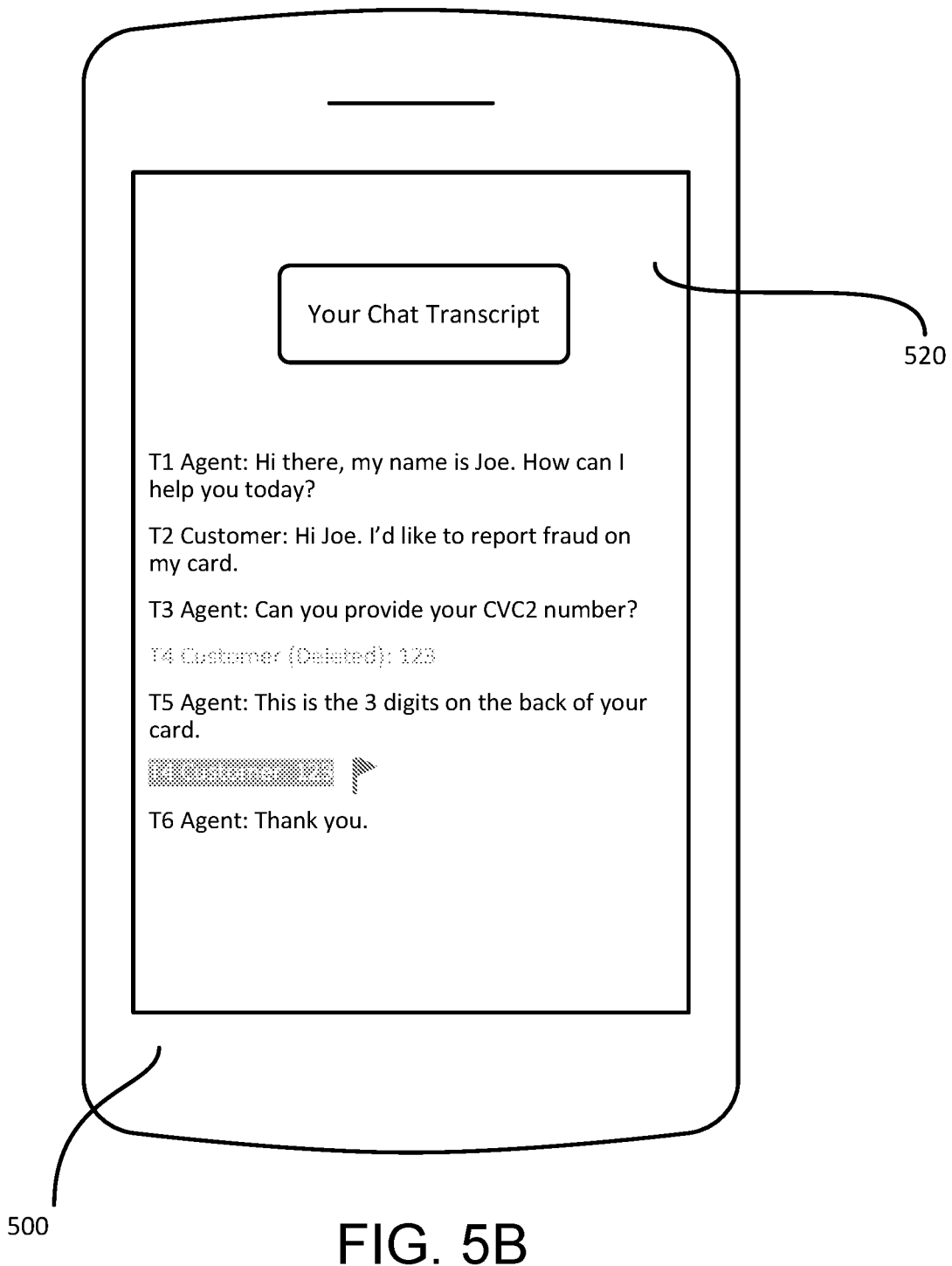

At step 418, the intelligent sorting server may provide, to a client device, a transcript of the chat messages associated in the second order. The intelligent sorting server may also present an indication that at least one chat message has been repositioned. FIG. 5B shows example user interfaces displaying reordered chat messages according to one or more aspects of the disclosure. FIG. 5B displays a transcript of chat messages on a user device 500. The transcript may be displayed to the user in real time.

With respect to FIG. 5B, display screen 520 of user device 500 may display, for example, six chat messages between a customer and a customer service agent. The fourth message "123" at T4 from the customer has been greyed out, indicating this message has been relocated to a new position after T5. In its new position between T5 and T6, the message "123" at T4 has been highlighted, indicating this message has been relocated to this new position. The display may also include an indication such as a "flag" to further indicate the repositioning of the message at T4. It should be noted that any indication can be displayed in accordance with various aspects of the disclosure.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    receiving, by a server and from a client device associated with a user, a plurality of chat messages;
    identifying, using a first machine learning classifier and based on an input comprising one or more query indicators in the plurality of chat messages and a user input pattern associated with the user, a chat message, in the plurality of chat messages, as a candidate for reordering, wherein the one or more query indicators indicate that a particular chat message in the plurality of chat messages is associated with a query message;
    generating, based on the identified candidate for reordering, a transcript of the plurality of chat messages; and
    providing, to the client device, the transcript of the plurality of chat messages and an indication that at least one chat message has been repositioned.

2. The computer-implemented method of claim 1, wherein each chat message includes a timestamp that indicates a time at which each chat message was transmitted to the server, and the method further comprising:
    determining, based on a chronologic order of the timestamps, a first order of the plurality of chat messages; and
    determining, based on the identified candidate for reordering, a second order of the plurality of chat messages.

3. The computer-implemented method of claim 1, wherein identifying the chat message as the candidate for reordering further comprises:
    assigning a first weight to the one or more query indicators in the plurality of chat messages;
    assigning a second weight to the user input pattern associate with the user; and
    identifying, using the first machine learning classifier and based on the first weight and the second weight, the chat message as the candidate for reordering.

4. The computer-implemented method of claim 3, wherein identifying the chat message as the candidate for reordering further comprises:
    providing, as inputs to the first machine learning classifier, a timestamp difference between the chat message and a previous chat message, wherein the timestamp difference is assigned with a third weight; and
    identifying, using the first machine learning classifier and based on the third weight, the chat message as the candidate for reordering.

5. The computer-implemented method of claim 4, wherein the third weight is greater than the first weight and the second weight.

6. The computer-implemented method of claim 1, further comprising:
    generating, using a second machine learning classifier, similarity scores for the plurality of chat messages, wherein a similarity score indicates a contextual similarity between a chat message and a previous chat message.

7. The computer-implemented method of claim 6, wherein identifying the chat message as the candidate for reordering further comprises:
    providing, as input to the first machine learning classifier, the similarity scores generated by the second machine learning classifier; and
    identifying the chat message as the candidate for reordering based on the similarity scores.

8. The computer-implemented method of claim 6, wherein:
    the first machine learning classifier comprises a supervised machine learning classifier; and
    the second machine learning classifier comprises an unsupervised machine learning classifier.

9. The computer-implemented method of claim 1, wherein identifying the chat message as the candidate for reordering further comprises:
    determining, using the first machine learning classifier, a probability score indicating a likelihood that the chat message is to be clustered together with a previous chat message; and
    identifying the chat message as the candidate for reordering based on the probability score.

10. The computer-implemented method of claim 9, wherein using the first machine learning classifier comprises receiving the probability score as an output from the first machine learning classifier.

11. The computer-implemented method of claim 1, further comprising:
    determining, based on one or more keywords in the plurality of chat messages, a domain associated with the first machine learning classifier; and
    training, based on domain specific training data, the first machine learning classifier.

12. An apparatus, comprising:
    one or more processors; and
    memory storing instructions that, when executed by the one or more processors, cause the apparatus to:
    receive, from a client device associated with a user, a plurality of chat messages;
    identify, using a first machine learning classifier and based on an input comprising one or more query indicators in the plurality of chat messages and a user input pattern associated with the user, a chat message, in the plurality of chat messages, as a candidate for reordering, wherein the one or more query indicators indicate that a particular chat message in the plurality of chat messages is associated with a query message;

generate, based on the identified candidate for reordering, a transcript of the plurality of chat messages; and provide, to the client device, the transcript of the plurality of chat messages and an indication that at least one chat message has been repositioned.

13. The apparatus of claim 12, wherein each chat message includes a timestamp that indicates a time at which each chat message was transmitted to the apparatus, and wherein the instructions, when executed by the one or more processors, cause the apparatus to:

determine, based on a chronologic order of the timestamps, a first order of the plurality of chat messages; and determine, based on the identified candidate for reordering, a second order of the plurality of chat messages.

14. The apparatus of claim 12, wherein the instructions, when executed by the one or more processors, cause the apparatus to identify the chat message as the candidate for reordering by:

assigning a first weight to the one or more query indicators in the plurality of chat messages;

assigning a second weight to the user input pattern associate with the user; and identifying, using the first machine learning classifier and based on the first weight and the second weight, the chat message as the candidate for reordering.

15. The apparatus of claim 14, wherein the instructions, when executed by the one or more processors, cause the apparatus to identify the chat message as the candidate for reordering by:

providing, as inputs for the first machine learning classifier, a timestamp difference between the chat message and a previous chat message, wherein the timestamp difference is assigned with a third weight; and identifying, using the first machine learning classifier and based on the third weight, the chat message as the candidate for reordering.

16. The apparatus of claim 15, wherein the third weight is greater than the first weight and the second weight.

17. The apparatus of claim 12, wherein the instructions, when executed by the one or more processors, cause the apparatus to:

generate, using a second machine learning classifier, similarity scores for the plurality of chat messages, wherein a similarity score indicates a contextual similarity between a chat message and a previous chat message.

18. The apparatus of claim 17, wherein the instructions, when executed by the one or more processors, cause the apparatus to identify the chat message as the candidate for reordering by:

providing, as input to the first machine learning classifier, the similarity scores generated by the second machine learning classifier; and identifying the chat message as the candidate for reordering based on the similarity scores.

19. A non-transitory machine-readable medium storing instructions that, when executed by one or more processors, cause the one or more processors to perform steps comprising:

receiving, from a client device associated with a user, a plurality of chat messages;

identifying, using a first machine learning classifier and based on an input comprising one or more query indicators in the plurality of chat messages and a user input pattern associated with the user, a chat message, in the plurality of chat messages, as a candidate for reordering, wherein the one or more query indicators indicate that a particular chat message in the plurality of chat messages is associated with a query message;

generating, based on the identified candidate for reordering, a transcript of the plurality of chat messages; and providing, to the client device, the transcript of the plurality of chat messages and an indication that at least one chat message has been repositioned.

20. The non-transitory machine-readable medium of claim 19, wherein the user input pattern comprises one or more keywords that the user used to indicate query messages.

* * * * *